Dec. 21, 1954

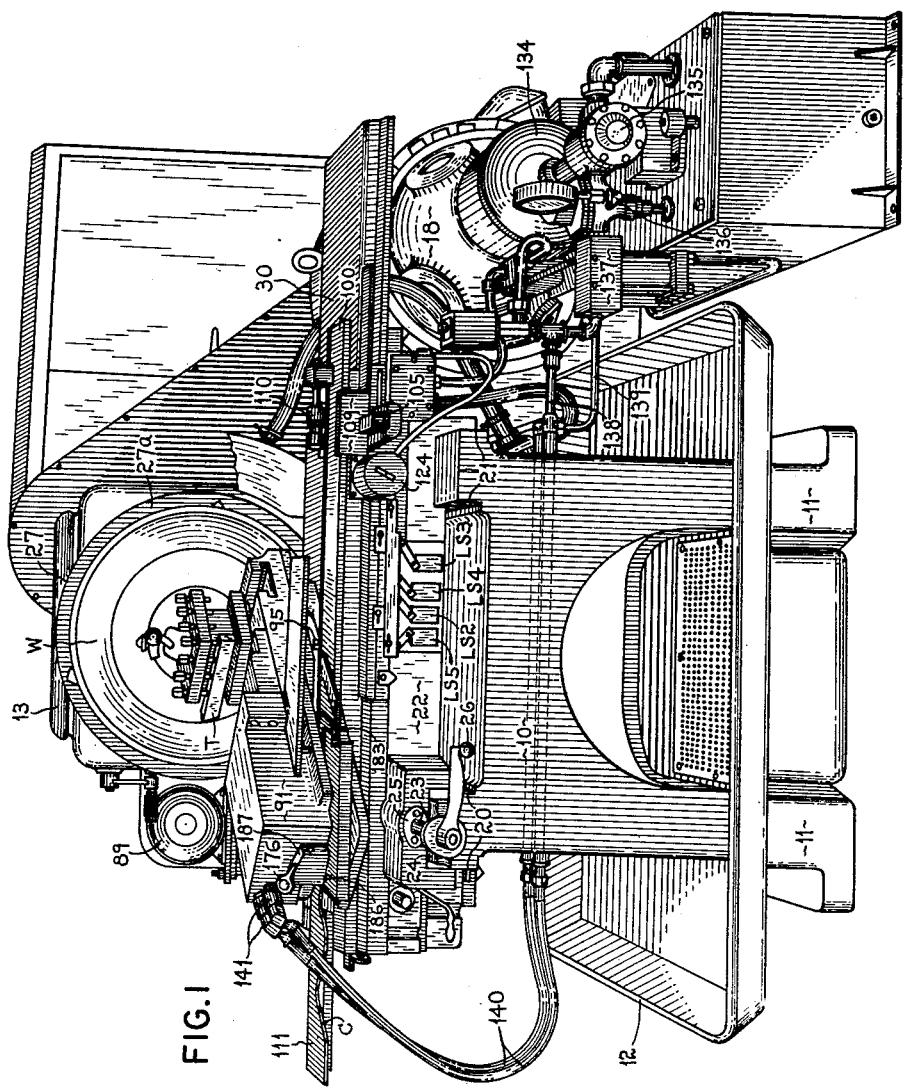

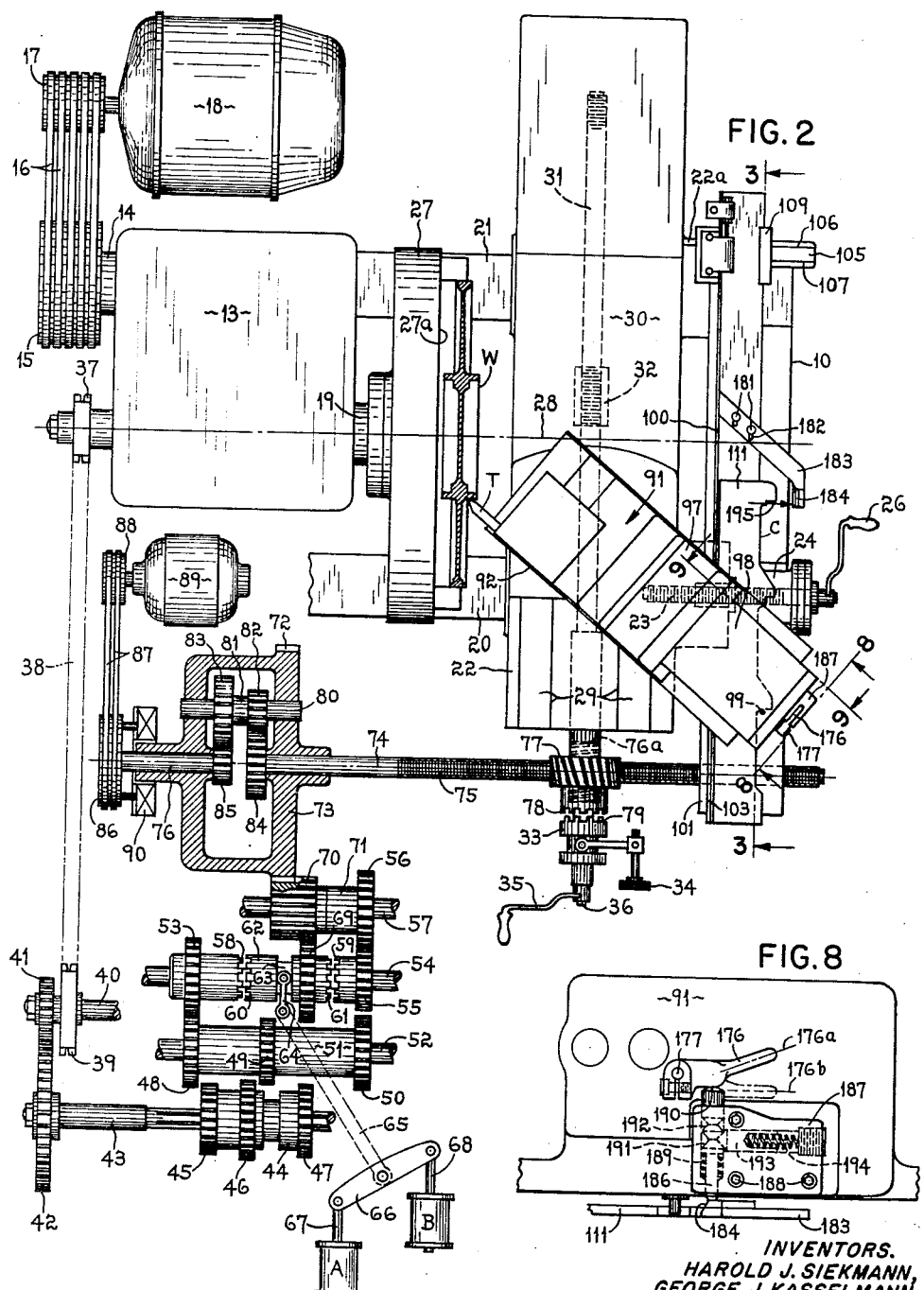

H. J. SIEKMANN ET AL 2,697,373

TRACER CONTROLLED FACING LATHE

Filed May 8, 1952

INVENTORS.
HAROLD J. SIEKMANN,
GEORGE J. KASSELMANN,
GEORGE W. LUNING AND
NELSON D. COOPER

BY

ATTORNEY.

Dec. 21, 1954  H. J. SIEKMANN ET AL  2,697,373
TRACER CONTROLLED FACING LATHE
Filed May 8, 1952  5 Sheets-Sheet 4

INVENTORS.
HAROLD J. SIEKMANN,
GEORGE J. KASSELMANN,
GEORGE W. LUNING AND
NELSON D. COOPER

BY
ATTORNEY.

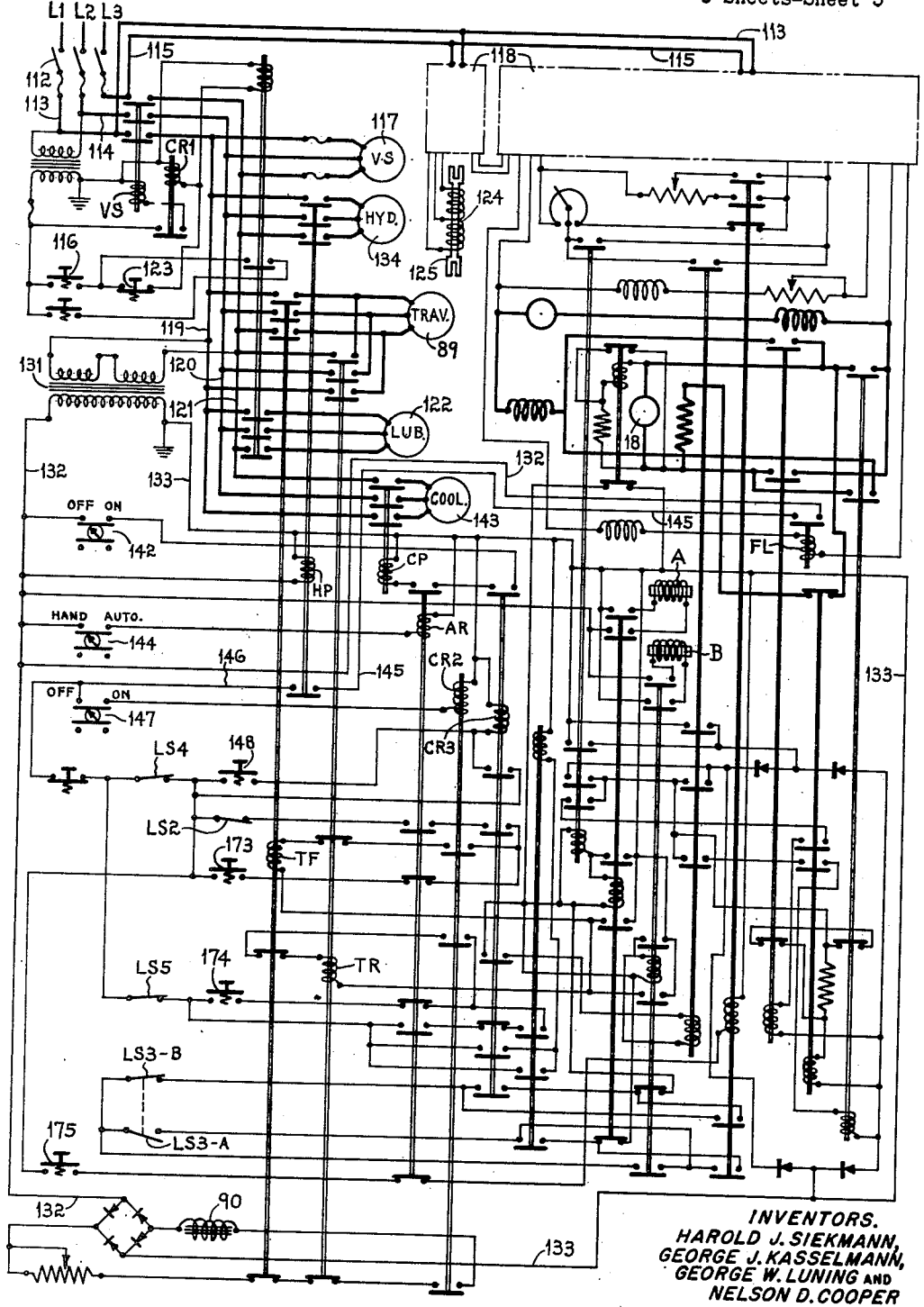

United States Patent Office 2,697,373
Patented Dec. 21, 1954

2,697,373

TRACER CONTROLLED FACING LATHE

Harold J. Siekmann, George J. Kasselmann, and George W. Luning, Cincinnati, and Nelson D. Cooper, Mariemont, Ohio, assignors to The R. K. Le Blond Machine Tool Company, Cincinnati, Ohio, a corporation of Delaware Application May 8, 1952, Serial No. 286,782

1 Claim. (Cl. 82—24)

This invention pertains to machine tools and is more particularly directed to an improved tracer controlled facing lathe.

One of the objects of this invention is to provide an improved machine tool or lathe for machining irregular and variegated surfaces on the face of a revolving workpiece.

Another object of this invention is to provide an improved machine tool for contour facing a rotatable workpiece in the machine.

Another object of this invention is to provide an improved tracer controlled facing lathe in which the cutting tool feeds continuously diametrically of the workpiece from one outside periphery across the center of rotation of the workpiece and spindle of the lathe to the opposite periphery of the workpiece.

It is also an object of this invention to provide an improved facing lathe in which a rotatable workpiece is machined by the diametral movement of a cutting tool across the face of the work and beyond the center of rotation from the side of initial beginning of the cut and to effect an automatic continuous feed of the tool in timed relationship with the spindle in one diametral direction while at the same time reversing the spindle upon passage of the tool past the center of rotation of the work and to also effect a variable speed control in timed relationship with these movements of the cutting tool for varying the speed of rotation of the work to maintain constant cutting speed at all times.

Still another object of this invention is to provide an improved tracer controlled facing lathe in which a part of the face of the workpiece to be machined is cut by the radial inward movement of the cutting tool toward the work spindle axis and then upon continued movement of the tool in the same direction beyond the axis of rotation of the spindle outwardly toward the periphery of the workpiece, other portions of the face of the work are then machined to completely finish the entire face of the workpiece upon the complete diametral feeding of the tool across the entire face of the work.

Still another object of this invention is to provide an improved tracer controlled facing lathe in which contour machining is performed on the face and other portions of a chucked workpiece on the work spindle in such a manner that a part of the contour's cut on the work are done by the radial inward feeding of the tool toward the center of the work and that further contour forms are cut on the same workpiece upon continued feeding movement of the tool beyond said axis of rotation and upon reversal of the work spindle with the passage of the tool past the axis of rotation of the work.

Further features and advantages of this invention will appear from a detailed description of the drawings in which:

Fig. 1 is a right hand end elevational view showing a tracer controlled facing lathe incorporating the features of this invention.

Fig. 2 is a diagrammatic showing of the mechanical driving mechanism for the lathe shown in Fig. 1.

Fig. 7 is a wiring diagram of the power and control circuits for the machine.

Fig. 8 is an enlarged end elevation of the withdrawal control mechanism for the tool slide on the line 8—8 of Figs. 2 and 6.

Figure 5:
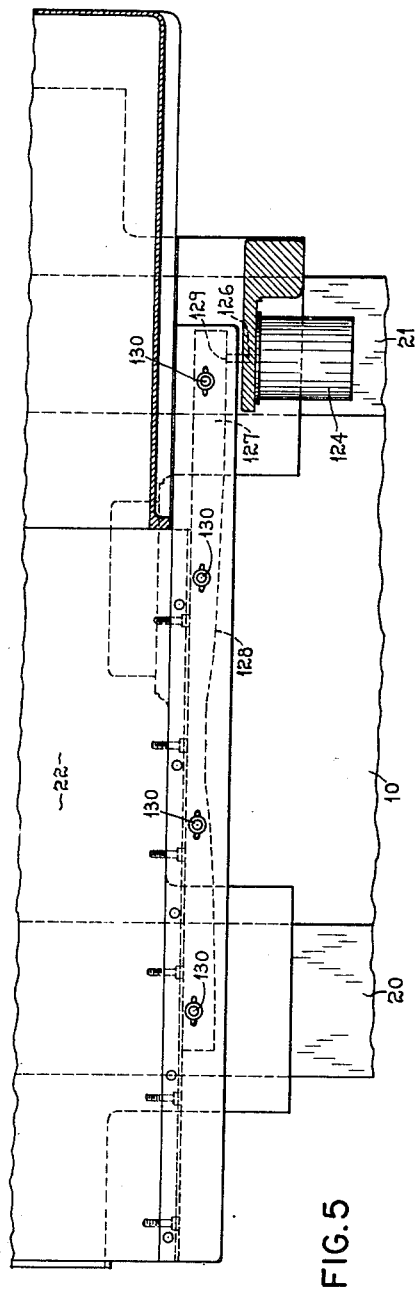
Fig. 5 is a section on the line 5—5 of Fig. 3.

As exemplary of one embodiment of this invention there is shown a tracer controlled facing lathe having a base or bed 10 which is supported on suitable legs 11 and a chip pan 12. Mounted on the bed 10 is the headstock 13 which has a suitable transmission, preferably with several speed changes therein, which is driven from the input shaft 14 of the headstock 13 from the main drive pulley 15 which in turn is connected to suitable belts 16 to the main driving pulley 17 of the main drive variable speed alternating current motor 18. The work spindle 19 is driven from the transmission in the headstock 13 in any well known conventional manner.

The bed 10 of the machine is provided with suitable guideways 20 and 21 upon which is longitudinally movably mounted the lathe carriage 22 and which carriage may be adjusted to desired positions on the ways 20 and 21 by a suitable adjusting screw 23 which is journaled against axial movement in a bracket 24 fixed to the right hand end of the bed way 20 and having a threaded portion operating in a mating adjusting nut 25 fixed in the carriage 22. A suitable clamping mechanism (not shown) may be provided and operated by the clamp handle 26 for locking the carriage 22 in any desired adjusted position on the bed ways 20 and 21. By this arrangement the carriage 22 may be adjusted to and from the work spindle 19 and the face plate or chuck 27 carried on the work spindle and which in turn supports the workpiece W. Thus adjustment of the carriage 22 may be effected parallel to the axis of rotation 28 of the lathe spindle 19.

Mounted on the carriage 22 on suitable dove tail guideways 29 is the cross slide 30 for movement perpendicular to the spindle axis 28 and parallel to the face 27a of the faceplate or chuck 27. The cross slide 30 may be adjusted or fed diametrically of the face plate or chuck 27 and work W by means of the cross feed screw 31 which is suitably journaled in the carriage 22 against axial movement and operates in a cross feed nut 32 fixed to the cross slide 30 of the lathe.

The cross feed screw 31 may be rotated for effecting feeding movement manually by disengaging the clutch member 33 by pulling on the pull knob 34 and applying the crank handle 35 to the squared end socket receiving portion 36 of the cross feed screw 31. The cross feed screw 31 is also driven in its feeding movement in timed relationship with the rotation of the work spindle 19 so as to maintain at all times a constant feed or movement relative to the axis of rotation 28 of the work for every rotation of the work spindle 19 and workpiece W. Fixed on the rear end of the work spindle 19 is the sprocket pulley 37 over which operates the roller chain 38 which in turn operatively engages the idler sprocket 39 journaled on a suitable quadrant shaft 40 and in turn connected in driving relationship with a pick-off gear 41 also supported and journaled on the quadrant shaft 40 in any suitable well known manner. The gear 41 in turn drives the pick-off gear 42 which is mounted in driving relationship on the input shaft 43 of the feed train mechanism of the lathe. Slidably mounted in driven relationship on the shaft 43 is the triple shiftable gear 44 having gears 45, 46 and 47 formed thereon which in turn engage the gears 48, 49 and 50 respectively of the triple gear 51 rotatably journaled on an intermediate supporting shaft 52. The gear 48 engages a gear 53 of the same size journaled on a supporting shaft 54 while the gear 50 engages a similar gear 55 journaled on the supporting shaft 54 thru an idler gear 56 journaled on a shaft 57 so as to provide a reversal direction of rotation for the respective gears 53 and 55 on the shaft 54. The gear 53 is provided with clutch teeth 58 and the gear 55 is provided with clutch teeth 59 which are respectively engaged by clutch teeth 60 and 61 formed on the clutch gear 62 slidably mounted on the shaft 54.

The clutch gear 62 is provided with an annular groove 63 which is engaged by a shifter yoke 64 carried on a rock shaft 65 to the outer end of which is fixed the rocking beam 66 having its outer ends connected to the armature 67 and 68 of the respective operating solenoids A and B. Thus when either of the solenoids A or B are operated the clutch member 62 may be shifted to effect drive in one direction or the other to the clutch gear 62.

The clutch gear 62 has a gear 69 formed thereon which is continuously in engagement with the wide faced gear 70, for any of its shifted positions, which gear 70 is formed on the compound gear 71 and is journaled on the shaft 57 and is in constant driving mesh with the large ring gear 72 formed on the differential cage housing 73 which is suitably rotatably mounted for rotation about the axis 74 that is common to the feed rod 75 and the rapid traverse input shaft 76. The feed rod 75 is slidably mounted in driving relationship to the spiral gear 76a which is suitably supported on the carriage 22 of the lathe. The gear 76a in turn drives the spiral gear 77 having clutch teeth 78 which are adapted to be engaged by mating clutch teeth 79 formed on the clutch spool 33 so that when the push knob 34 is moved to engage the clutch members 78—79 a drive is provided from the feed rod 75 to the cross feed screw 31.

In the differential cage 73 is fixed the planetary gear shaft 80 upon which is journaled the compound gear 81 having the smaller gear 82 and the larger gear 83. The smaller gear 82 engages a gear 84 fixed on the feed rod 75 while the gear 83 engages a mating gear 85 fixed on the rapid traverse input shaft 76. The outer end of the rapid traverse shaft 76 is provided with a driving pulley 86 which is connected thru suitable belts 87 with the driving pulley 88 on the rapid traverse drive motor 89. An electric brake 90 is provided in connection with the driving pulley 86 which may be energized to lock the pulley 86 and therefore the shaft 76 against rotation or to release said shaft and pulley for free driving rotation from the rapid traverse motor 89. During the normal feeding operation of the cross slide thru the cross feed screw 31 the electric brake 90 is energized to lock the pulley 86 and shaft 76 against rotation so that feed driving power coming in from the gear 70 and rotating the differential cage 73 causes the planetary shaft 80 to rotate about the axis 74 of the feed rod 75 and thru the gearing 85—83 and 82—84 to effect a slow feed driving motion to the feed rod 75. When the electric brake 90 is released and the rapid traverse motor 89 energized, for either direction of rotation, the feed rod 75 may be rotated rapidly for rapid traverse movement of the cross slide 30 in either direction.

The cutting tool T of the machine is carried on the cross slide 30 and reciprocated in angularly related direction relative to the feeding movement of the cross slide 30 by a hydraulically operated tracer controlled tool unit indicated generally at 91. This unit may preferably take the form and utilized control structure and mechanism as shown in Patents 2,516,495; 2,474,134 and 2,559,138 and in co-pending applications Serial No. 736,136 filed March 21, 1947, and Serial No. 773,188 filed September 10, 1947. The detail structure of the hydraulic tool control unit 91 need not be discussed here as its individual structure forms no particular part of this invention. The unit, however, comprises a bottom swivel slide member 92 which is pivotally mounted for swinging movement about a vertical axis 93 on a pivot pin 94 fixed in the cross slide 30 and is clamped in any desired angular position around the axis 93 and pin 94 by suitable T-slot clamping bolts 95 operating in the annular T-slot groove 96 in the manner of a compound rest bottom slide structure for a lathe. Reciprocably mounted on the bottom swivel slide 92 is the tool slide 97 which carries a suitable tool block 98 which in turn carries the cutting tool T. The tool slide 97 may be reciprocated by suitable hydraulic cylinder and valve control means in the portion 98 of the tool slide 97 having a structure similar to that of the aforementioned patents and co-pending applications. It is believed sufficient to state that a tracer control finger 99 is provided in connection with the tool slide 97 and its operating mechanism indicated generally at 98 to effect a tracer controlled operation and reciprocation of the tool slide 97 on the bottom swivel slide 92 so as to move the cutting tool T in an angularly related direction, depending upon the setting of the bottom slide 92, relative to the direction of feeding movement of the cross slide 30 by the cross feed screw 31 as described.

A template bar support 100 is slidably mounted in a guide bracket 101 pivotally mounted at 102 on the bottom swivel slide member 92 so as to provide sliding guideways 103 for the relative movement of the template bar 100 and the tool slide member 91. Suitable means are provided at 104 to clamp the guide member 101 against pivotal movement about point 102 after the tool unit member 91 has been set in its desired angular position on the cross slide 30.

The other end of the guide bar is held against longitudinal movement by a transverse guide bar member 105 which is rigidly fixed to a projecting arm portion 22a of the carriage 22. The bar 105 has guideways 106 and 107 which engage the rollers 108 of a guide shoe 109 which is securely clamped to the template bar 100 so that the bar is limited against all longitudinal movement in a direction parallel to the direction of feeding movement of the cross slide 30 but is allowed full freedom of movement perpendicular to said movement in a direction parallel to the lathe spindle axis 28. A fine micrometer adjustment is mounted at 110 so that the guide bar 109 may be relatively adjusted with regard to the surfaces 106 and 107 of the transverse guide bar member 105 for precise positioning of a template 111 suitably mounted upon the template bar member 100. Thus, as the cross slide 30 is actuated in feeding or rapid traverse movements the tracer finger 99 will follow the contour C of the template 111 and reproduce, by reciprocation of the tool slide 97, the identical shape on the workpiece W.

Figure 6:
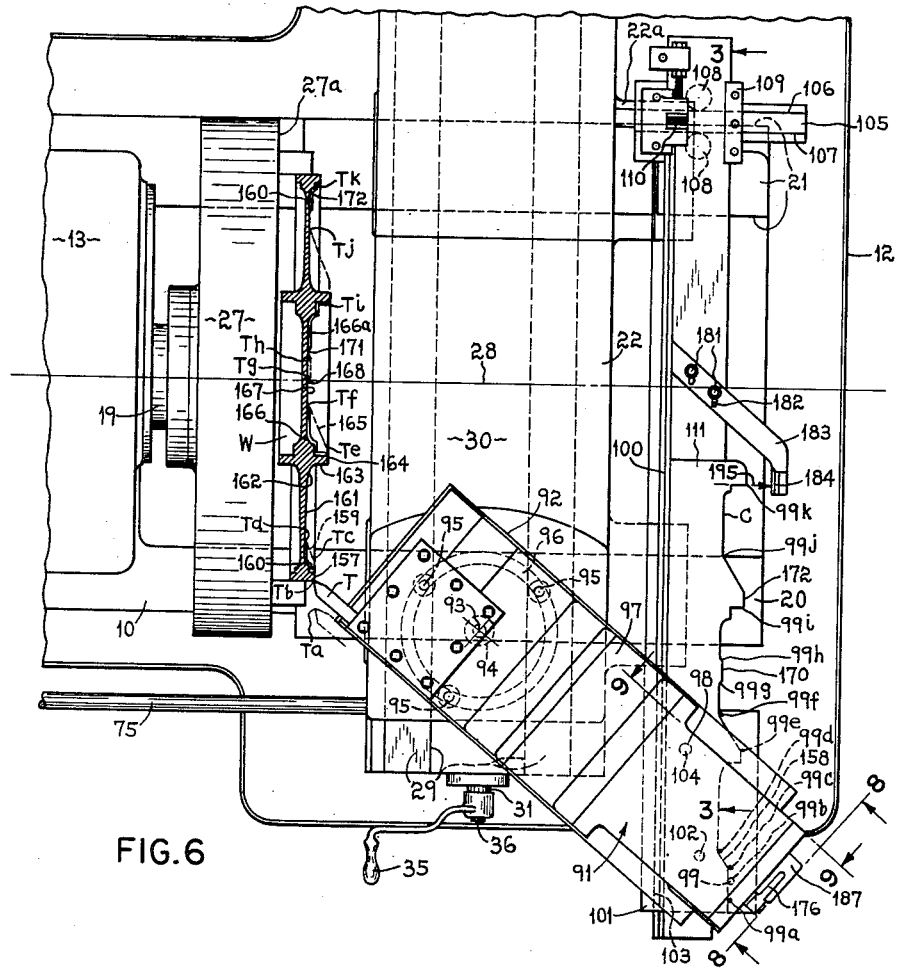
Fig. 6 is an enlarged fragmentary plan view showing particularly a diametral section thru the workpiece and the related template for controlling the movement of the tool.

Referring particularly to Figs. 6 and 7, the operation of the machine is as follows:

With the main line switch 112 closed the leads 113, 114 and 115 are thus energized. The operator then presses the start-push button 116 for the main drive variable speed apparatus indicated generally at 117 and 118 which is of standard commercial design, the closing of the push button 116 energizing relay coil LP and also relay coil CR1 and VS to then apply power to the main power supply leads 119, 120 and 121. The contacts to the lubrication pump 122 are also closed at this time to start the lubricating pump motor 122 to supply the necessary lubrication to the machine mechanism. The entire machine may be de-energized at any time by pressing the stop push button 123.

Figure 3:
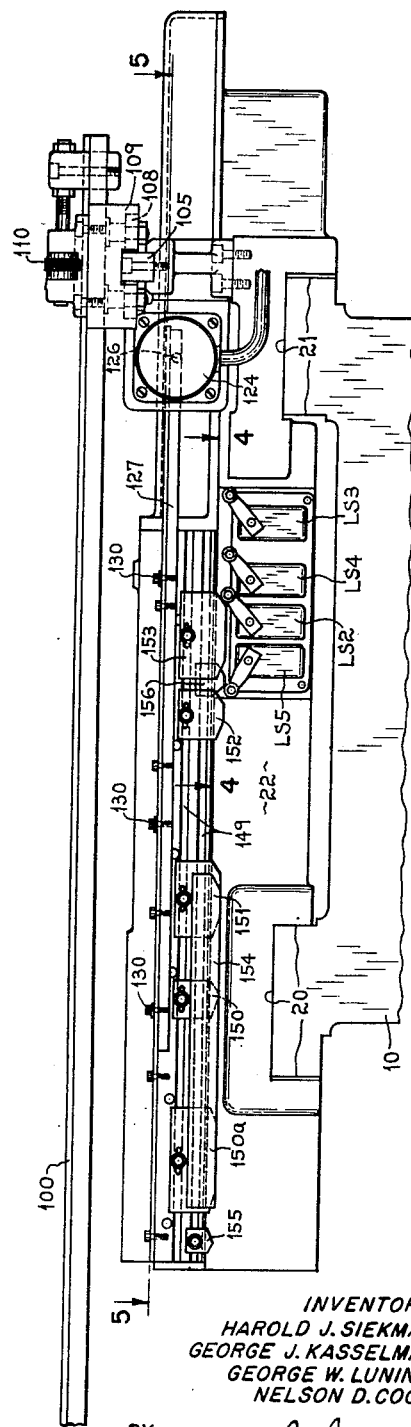
Fig. 3 is an enlarged fragmentary view of the right hand end of the lathe particularly showing the carriage cross slide and hydraulic tracer controlled slides of the machine, indicated by the line 3—3 of Figs. 2 and 6.

The main drive motor 18 may be operated at variable speeds thru a commercially well known variable speed control panel indicated at 118 by use of any standard control device such as the variable speed reactor 124 having a movable armature 125 terminating in an actuating plunger 126, Figs. 3 and 5, which is engaged by a cam 127 having an actuating surface 128 engaging the outer end 129 of the plunger 126 and carried on the cross slide of the machine and held in place by suitable clamping screws 130, the reactor 124 itself being preferably suitably mounted on the carriage 22 of the lathe. By this arrangement the feeding movement of the carriage in either direction effects a change in speed of rotation of the main drive spindle motor 18 such that as the tool moves from a withdrawn position at the beginning of the cutting cycle away from the work spindle axis toward the front of the machine, the work spindle is rotating at a relatively slow speed. As the tool feeds inwardly toward the axis of rotation 28 of the work W the movement of the plunger of the reactor relative to the cam plate surface 128 causes a gradual increase in speed of the motor until a maximum speed is reached when the tool has arrived at the center line of the spindle 28. Continued movement of the tool beyond this position radially outwardly of the axis of rotation 28 toward the rear of the lathe then causes the spindle to automatically decrease its speed again to the former speed at the beginning of the cutting cycle as the tool arrives at the rear of the lathe at the outer periphery of the workpiece.

As soon as leads 119 and 121 are energized the control current transformer 131 is likewise energized to apply current to the control current leads 132 and 133 which in turn energizes relay coil HP to close the power contacts to energize the hydraulic fluid pressure pump motor 134. The hydraulic pump motor 134 is connected to a suitable hydraulic pump 135, Fig. 1, and thru suitable control valve means indicated generally at 136 and 137 and the supply and return leads 138 and 139 connected to the hydraulic tracer controlled tool unit 91 by suitable flexible hose lines 140 and connectors 141, supplies the necessary fluid pressure under control of the tracer 99 to reciprocate the tool slide 97 in response to the configuration of the surface C on the template 111 as described. A manually operated control switch 142 may be used to cut off operation of the coolant pump motor 143 or to connect this pump motor 143 into an automatic operating cycle under control of the relay coil CP. The hand or automatic cycle is controlled by manipulating the control switch 144 to hand or automatic position, and when in automatic position the relay coil AR is energized thus cutting in the coolant pump relay coil CP.

Assuming the tool slide to be in fully retracted position at the beginning of the cutting cycle at the front of the machine and referring particularly to Fig. 6, the tracer valve finger 99 will then be located substantially at the point 99a and the cutting tool will be located at the point Ta. At the time the variable speed control unit 118 is appropriately energized as described the relay coil FL is likewise energized to interconnect lead 132 with lead 145 and since relay coil HP has been energized as described lead 145 is then connected with lead 146 to provide energy for the spindle, feed, and rapid traverse apparatus for the lathe. The operator then sets the selector switch 147 in the feed on position and then presses the spindle start button 148 to begin the operating cycle of the lathe. Having done so with relay coils CR2 and CR3 energized the traverse forward relay coil TF will then be energized to close the power contacts to energize the rapid traverse motor 89 for forward direction of rapid traverse movement and to at the same time de-energize the magnetic brake 90 to then allow rapid power traverse to be transmitted to the shaft 76, Fig. 2, to the feed rod 75 and the lead screw 31 as described.

Fixed on the carriage 22 is a series of four limit switches LS2, LS3, LS4 and LS5 each of which are actuated by a series of dogs or cams adjustably mounted on suitable guideways 149 on the cross slide 30 of the lathe. The limit switch LS2 is actuated by trip dogs 150, 151, 152 and 153. The limit switch LS3 is actuated by trip dog 154, while limit switch LS4 is actuated by the trip dog 155. The limit switch LS5 is actuated by the trip dog 156. When the cross slide 30 is in fully retracted position with the tracer finger at position 99a and the tool at position Ta limit switch LS5 is actuated by trip dog 156 to hold LS5 open so as to eliminate the rapid traverse reverse and to keep the relay coil TR de-energized. At this time trip dog 153 is in position to hold limit switch LS2 closed for forward rapid traverse movement, which movement continues so long as trip dog 153 maintains LS2 closed. Limit switch LS4 at this time remains normally closed as it is not contacted by its trip dog 155. As soon as the cross slide starts forward from tool position Ta limit switch LS5 is released from the trip dog 156 and likewise closes in preparation for the traverse reverse at the end of the cutting cycle.

The traverse movement continues from position 99a—Ta to position 99b—Tb at which time limit switch LS2 is released and opened stopping the rapid traverse movement where upon the rapid traverse motor 89 is de-energized and the magnetic brake 90 energized and set so that with the operation of the work spindle rotating as has previously been set up, the feed drive through the chain 38 and the mechanism described is then applied to the cross feed screw 31. During this feeding movement the cutting tool T machines the work surface 157 in accordance with the configuration of the surface C on the template corresponding to this part of the workpiece. Having completed this operation at the correct feeding speed, the trip dog 152 now engages the forward traverse limit switch LS2 to cause traverse movement from the end of the feed position 99c—Tc to again take place. The template is so designed as to have an angular clearance path 158 which causes the tool to trace a surface 159 relative to the workpiece so as to avoid machining out the portion 160 at this stage of the cycle, this portion being shown in double line as indicated in Fig. 6. The purpose of eliminating this portion is to avoid the necessity of swinging the tool control unit 91 around to an angular direction substantially at 90 degrees to position indicated in Fig. 6 in order to get in to the configuration formed by the metal portion 160 of the workpiece.

The cross slide 30 continues at traverse movement under control of the dog 152 until the tool arrives at the position Td with the tracer finger 99 at the point 99d. At this point the tool again takes up the cutting action on the work surface 161 and at the same time the trip dog 152 releases the limit switch LS2 and reinstates the feed drive as described with the rapid traverse motor 89 being de-energized and the magnetic brake 90 again being energized to hold the shaft 76 to effect the feed drive for the lathe as described.

The tool T continues to cut the surface 161 and the radius portion 162 and the diametral portion 163 and then follows along the work surface 164 in an automatic tracer controlled manner in accordance with the same portions between the points 99d and 99e of the template when the tool finally arrives at the point Te. Again at position Te—99e rapid traverse is again instituted in the forward direction by the trip dog 151 engaging limit switch LS2 and the cutting tool T then feeds down the angular clearance path 165 by-passing the work surface portion 166 to be machined as indicated by the double line in Fig. 6 until the tool again arrives at the point Tf with the tracer finger at the point 99f. Again the feed forward is instituted by release of the limit switch LS2 from the dog 151 and a resumption of tracer controlled turning takes place on the surface 167 on the work until the cutting tool edge arrives at the exact center 168 of the workpiece which lies on the axis 28 of rotation of the work spindle and workpiece W. At this time the tracer finger arrives at the point 99g which corresponds to the point Tg of position of the cutting tool at the exact center 168 of the workpiece. This point is in exact register with the spindle center so that the cutting tool has thus moved to the exact center of the work where substantially no metal removing is taking place because of the infinitely small radius of rotation of the work at this point.

At this point the template has a raised portion on its surface at 170 which allows the tool to clear the workpiece surface 167 it has just machined as the tool now continues on beyond the center of the work toward the rear of the machine.

At this point of exact center position of relative travel of tool and workpiece, limit switch LS3 having the contacts LS3–A and LS3–B are repositioned from that shown in Fig. 7, by being actuated by the trip dog 154 so as to cause a reversal of the main drive spindle motor 18 to change the direction of rotation of the work spindle and workpiece. At the same time solenoid A, Fig. 2, which up to this time has been continuously energized for feed movement in one direction by engagement of the clutch gear 62 with the gear 53 is now de-energized and solenoid coil B energized to move the clutch gear 62 in the opposite direction so as now to direct feeding power to the gear 155, idler gear 156 which is connected to the input drive gear 50 to thus reverse rotation of the differential spider 73 and the drive to the feed screw 31 as described. The object of reversing the feed at the same instant that the spindle is reversed is for purposes of maintaining a continuous unidirectional feed for the cross slide 30 even tho the spindle direction has been reversed and yet using the same precise positive timed relationship of feed to work spindle rotation under either condition of operation of the spindle. Also at this same time of arrival of the cutting tool at the mid-point Tg rapid traverse movement is again instituted still in the same forward direction thru the shaft 76 and the differential drive gearing in the cage 73 as described by operating limit switch LS2 from trip dog 150. At this time the cutting tool, as stated above, is moved back by the raised surface 170 of the template 111 so that it is not cutting the previously machined work surface 167, but as the cutting tool arrives at the point Th the raised portion then drops down again to the correct work surface 171 so that beginning at the point 99h the tool again begins normal cutting operation on the workpiece which is now rotating in the opposite direction from the previously described tool feeding movement up to the center line of the spindle. At the point 99h—Th the rapid traverse has again been stopped in its forward movement by release of dog 150 from limit switch LS2 and the normal feed movement again instituted. The tracer finger 99 now follows the template surface between the points 99h and 99i until the cutting tool arrives at the point Ti during which cutting operation the previously by-passed metal to be removed at 166 is now machined out down to the correct line 166a so as to complete this portion of the workpiece. When the cutting tool finally arrives at the point Ti the template is provided again with a slightly raised portion 172 so that the tool clears the previously machined portion 164 of the workpiece and passes on at rapid traverse from position 99i to position 99j on the template and to position Tj back on the work surface to be machined, this motion taking place at rapid traverse due to contact of the trip dog 150a with limit switch LS2.

Figures 4, 9:
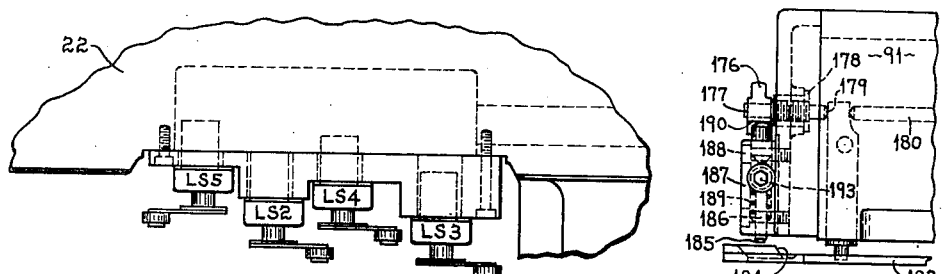
Fig. 4 is a section on the line 4—4 of Fig. 3.
Fig. 9 is a side elevation on the line 9—9 of Figs. 2 and 6.

As soon as the cutting tool T arrives at the position Tj feed again is instituted for the cross slide 30 as trip dog 150 is released from limit switch LS2 thus cutting out the forward rapid traverse. The cutting tool now follows the contour surface of the template between the points 99j and 99k with the tool finally arriving at the point Tk during which path of travel it now removes the by-passed portion of metal 160 previously left in the earlier stages of the machining operation, to thus complete the machining of the surface 172 on the workpiece. Thus the tool T has completely traversed every portion of the work surface to be machined in one single unidirectional feed movement across the center of rotation of the workpiece while the work spindle and feed are reversed (the feed being reversed only relative to the spindle), during the entire machining cycle, the same taking place at respective feed and rapid traverse movements, and with the tool initially by-passing certain portions of the work which are later picked up and completed at the final stages of the feed travel of the tool. After the tool finally comes to the point 99k—Tk the trip dog 155 engages the limit switch LS4 so as to open this switch and stop spindle rotation and, since rapid traverse reverse limit switch LS5 is closed at this time, institute rapid traverse travel of the tool from point Tk back to point Ta, the tracer control finger 99 traversing back either over the template or by appropriately holding the fluid pressure in the tracer unit, as shown in Figs. 2, 8 and 9, so as to completely retract the tool from the workpiece during the return movement. In this latter arrangement there is provided manually operable tracer plunger actuating lever 176 which is fixed to the rock shaft or plunger 177 threadedly journaled in the bushing 178 fixed in the tracer controlled tool unit 91 so that when the lever 176 is moved up or down the inner end 179 of the plunger will engage the tracer valve 180 of the unit 91 to control the movement of the tool slide. In this arrangement, when the lever 176 is in the up position 176a the tracer valve 180 is actuated by the plunger 177 to cause withdrawal of the tool away from the work. When the lever 176 is in down position 176b the plunger 177 is released from the tracer valve for normal movement of the tool slide toward the template 111 as described.

Adjustably mounted by suitable bolts 181 passing thru slots 182 on the template bar 100 is the trip dog 183 having a cam surface 184 adapted to engage the end 185 of the detent plunger 186 which is slidably in the bracket block 187 fixed to the tool slide 91 by the screws 188. A spring 189 normally urges the plunger 186 upward, with its upper end engaging the surface 190 of the lever 176. A pair of annular detent grooves 191 and 192 are formed in the plunger 186 which are engaged by the detent plunger 193 carried in the block 187 and urged toward the plunger 186 by the spring 194.

At the beginning of the cutting operation the operator depresses the lever 176 to position 176b to free the tracer valve 180 for the tracer controlled tracing operation described above. At the conclusion of the cutting operation the tool slide withdraws under tracer control in the direction indicated by the arrow 195 until the end 185 of the plunger 186 engages the cam surface 184 which shifts the plunger 186 upwardly, moving trip lever 176 to position 176a to hold the tracer valve 180 in position for retraction of the tool slide and tracer from the template for the rapid return movement to starting position.

Rapid traverse forward and reverse may be effected manually by pressing the respective push buttons 173 and 174 if required. Likewise, the work spindle may be jogged in forward direction by manipulating the jog push button 175. While a detailed description of each of the leads and connections in the operating circuit to accomplish the above mentioned results might be undertaken, it is not believed warranted or necessary in view of the fact that Fig. 7 is a wiring diagram which is self evident and discloses by direct inspection the exact operation of all of the necessary electric controls and relays for accomplishing the aforementioned results. Further, the specific apparatus used is of well known electrical design and construction and forms no specific part of the claimed inventive features of this case.

While the apparatus herein disclosed and described constitutes a preferred form of the invention, it is to be understood that the apparatus is capable of mechanical alteration without departing from the spirit of the invention and that such mechanical arrangement and commercial adaptation as fall within the scope of the appendant claim are intended to be included herein.

Having thus fully set forth and described this invention what is claimed as new and desired to be obtained by United States Letters Patent is:

A lathe carriage drive including a spindle, a main drive motor for rotating said spindle, feed change gearing driven from said spindle, reversing clutch means driven from said feed change gearing, a differential transmission having an element driven from said reversing clutch means, a rapid traverse drive motor connected to drive a second element of said differential transmission, a tool slide movable at right angles to the axis of rotation of said spindle, a tool on said tool slide having a cutting edge movable diametrically across a work piece on said spindle from one side to the other of said spindle axis, power transmission means driven from a third element of said differential transmission connected to actuate said tool slide, reversing clutch actuating means, main drive motor reversing means, and means operable by the movement of said tool slide to predetermined positions relative to said spindle axis for energizing simultaneously said reversing clutch actuating means and said main drive motor reversing means so as to automatically maintain the same direction of feed and rapid traverse movement for said cross slide for either direction of spindle rotation.

References Cited in the file of this patent

UNITED STATES PATENTS

| Number | Name | Date |
| --- | --- | --- |
| 400,820 | Back | Apr. 2, 1889 |
| 1,946,839 | Cole | Feb. 13, 1934 |
| 2,011,086 | Shaw | Aug. 13, 1935 |
| 2,170,888 | Abel | Aug. 29, 1939 |
| 2,293,510 | Le Tourneau | Aug. 18, 1942 |
| 2,295,079 | Groene | Sept. 8, 1942 |
| 2,347,367 | Rosen | Apr. 25, 1944 |
| 2,357,427 | Ruppel | Sept. 5, 1944 |
| 2,368,151 | McConnell | Jan. 30, 1945 |
| 2,392,074 | Wesson | Jan. 1, 1946 |
| 2,557,860 | Bickel | June 19, 1951 |
| 2,558,275 | Siekmann | June 26, 1951 |
| 2,587,542 | Siekmann | Feb. 26, 1952 |
| 2,608,109 | Hoelscher | Aug. 26, 1952 |
| 2,630,038 | Buell | Mar. 3, 1953 |

FOREIGN PATENTS

| Number | Country | Date |
| --- | --- | --- |
| 660,112 | Great Britain | Oct. 31, 1951 |